United States Patent [19]
Wolfe et al.

[11] Patent Number: 5,775,482
[45] Date of Patent: Jul. 7, 1998

[54] SNAP-IN MOUNT FOR PLUNGER SWITCH

[75] Inventors: Tonny B. Wolfe, Wadsworth; Thomas D. Williams, Hudson, both of Ohio

[73] Assignee: Delta Systems, Inc., Streetsboro, Ohio

[21] Appl. No.: 646,848

[22] Filed: May 8, 1996

[51] Int. Cl.$^6$ ................................................ H01H 9/08
[52] U.S. Cl. ........................................ 200/296; 200/295
[58] Field of Search ................................ 200/296, 295, 200/294

[56] References Cited

U.S. PATENT DOCUMENTS

| | | |
|---|---|---|
| 3,706,869 | 12/1972 | Sorenson ............................ 200/295 |
| 3,726,265 | 4/1973 | Howard . |
| 4,173,961 | 11/1979 | Howard . |
| 4,294,327 | 10/1981 | Howard . |
| 4,336,778 | 6/1982 | Howard . |
| 4,369,745 | 1/1983 | Howard . |
| 4,795,865 | 1/1989 | Howard . |
| 4,812,604 | 3/1989 | Howard . |
| 4,838,968 | 6/1989 | Nelson . |
| 4,839,478 | 6/1989 | Howard . |
| 4,894,019 | 1/1990 | Howard . |
| 4,924,046 | 5/1990 | Howard . |
| 5,052,935 | 10/1991 | James et al. . |
| 5,146,056 | 9/1992 | Kuczynski ............................ 200/296 |
| 5,190,019 | 3/1993 | Harvey . |
| 5,190,148 | 3/1993 | Williams . |
| 5,221,816 | 6/1993 | Williams . |
| 5,252,791 | 10/1993 | Williams . |
| 5,424,502 | 6/1995 | Williams . |
| 5,528,007 | 6/1996 | Williams et al. . |

FOREIGN PATENT DOCUMENTS 2559398  9/1976  Germany ......................... 200/295

*Primary Examiner*—Renee S. Luebke
*Attorney, Agent, or Firm*—Watts, Hoffmann, Fisher & Heinke Co. L.P.A.

[57] ABSTRACT

A switch apparatus having a switch housing supporting conductive switch terminals within a switch housing interior. A switch actuator is supported by the switch housing for movement along a travel path to control an actuation state of the switch by selectively shorting the conductive switch terminals. A structure allows the switch housing to be mounted into one of two different thickness mounting panels. The structure includes first and second retainer posts coupled to the switch housing at separate spaced locations along a longitudinal axis of the switch housing. Flexible first leg pairs and second leg pairs extend laterally from the respective retainer posts. The legs can be flexed away from a first position and, after insertion into a panel opening, return to the first position. Each of the legs have bottom portions that contact a mounting panel surface wherein a bottom portion of the first leg is spaced from a wall of the switch housing by a first gap and a bottom portion of the second leg is spaced from the wall of the switch housing by a second gap.

27 Claims, 4 Drawing Sheets

SNAP-IN MOUNT FOR PLUNGER SWITCH

FIELD OF THE INVENTION

The present invention concerns an electrical switch and more particularly concerns switch mounting structure that enables the switch to be mounted on panels of different thicknesses.

BACKGROUND ART

One prior art technique for mounting a switch housing is to provide a housing flange having apertures through which connectors can be inserted to mount the switch housing to a support surface. Delta Systems of Streetsboro, Ohio, assignee of the present invention, sells a prior art push button plunger switch designated as model number 6400 that utilizes such a mounting technique. This prior art switch includes a switch body or housing supporting two spaced apart switch terminals that are selectively bridged by a conductive contact carried by a moveable actuator.

When mounting the prior art switch housing to a support, a support surface is prepared by drilling two holes into the support surface and then aligning the holes of the housing flange with the two holes in the support surface. Connectors are then pushed through the flange and attached to the support surface to fix the switch housing to the support surface.

The prior art switch housing is relatively simple to install, but does require use of a tool to mount the housing to the support surface.

DISCLOSURE OF THE INVENTION

A new and improved switch constructed in accordance with the present invention includes a switch housing supporting conductive switch terminals within a switch housing interior. A switch actuator is supported by the switch housing for movement along a travel path to control an actuation state of said switch by selectively shorting the conductive switch terminals.

A housing structure allows the switch housing to be mounted into different thickness mounting panels. The structure includes first and second retainer posts coupled to the switch housing at separate spaced locations along a longitudinal axis of the switch housing. Flexible first and second legs extend laterally from respective one of two retainer posts. These legs are flexed from a first position and inserted into a panel opening in a mounting panel. Each of the legs have bottom portions that contact a mounting panel surface as they move back from their flexed positions. A bottom portion of the first leg is spaced from a wall of the switch housing by a first gap and a bottom portion of the second leg is spaced from the wall of the switch housing by a second gap.

The invention allows the switch housing to be mounted without special tools and furthermore permits installation into either one of two different panels having different thicknesses.

In accordance with the present invention the housing structure has specially configured legs having ramped portions for causing the legs to flex as the retainer posts are pushed into the panel opening. This allows the switch to be easily installed or removed with one hand. After the retainer posts are pushed into the opening the legs snap back to an unflexed configuration overlying the panel and inhibit any relative movement between the switch housing and the panel.

From the above it is seen that one object of the invention is the simple installation without resort to special tools of a switch housing in either one of two different panels having different thicknesses. This and other objects, advantages and features of the invention will be described in conjunction with a detailed description of a best mode for practicing the invention.

BEST MODE FOR PRACTICING THE INVENTION

Figure 1:
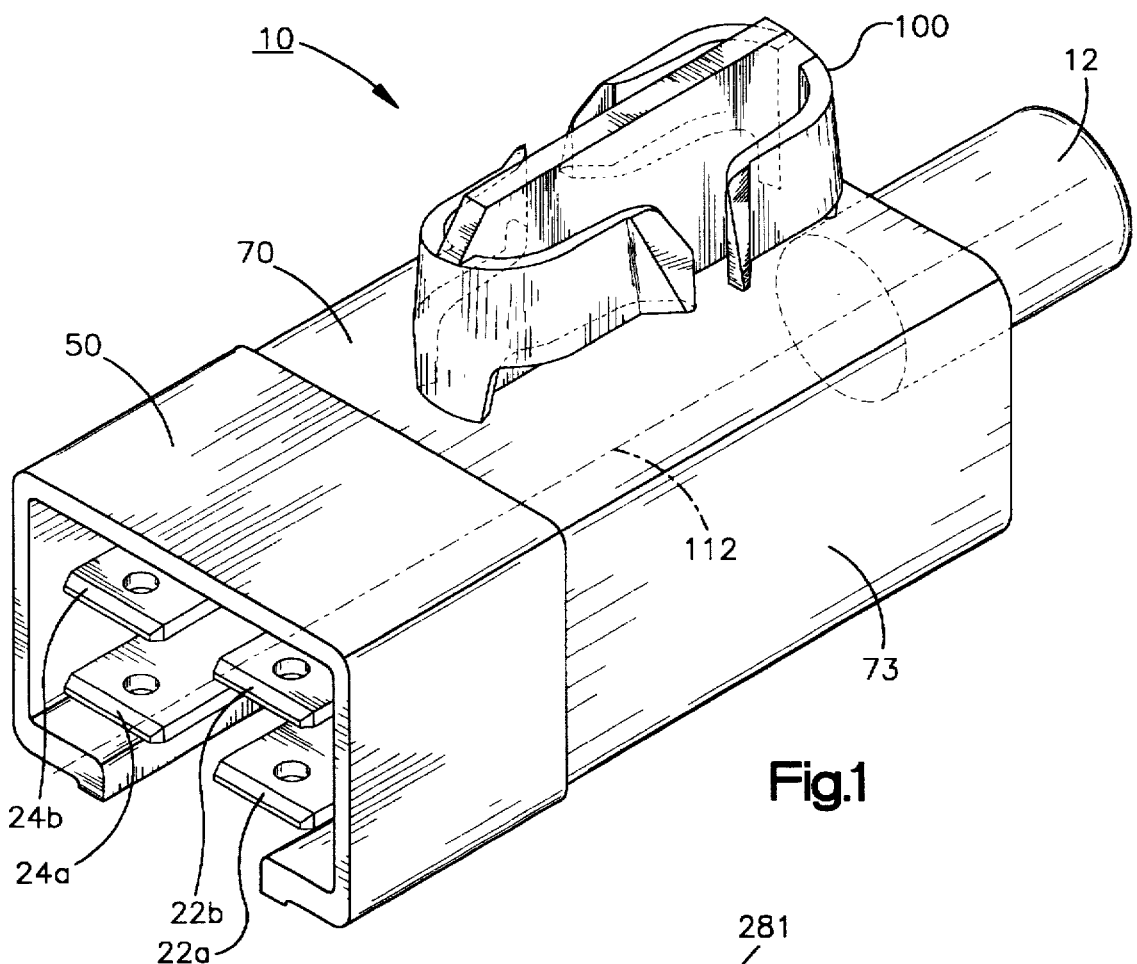
FIG. 1 is a perspective view of a switch constructed in accordance with the present invention.
Figure 2:
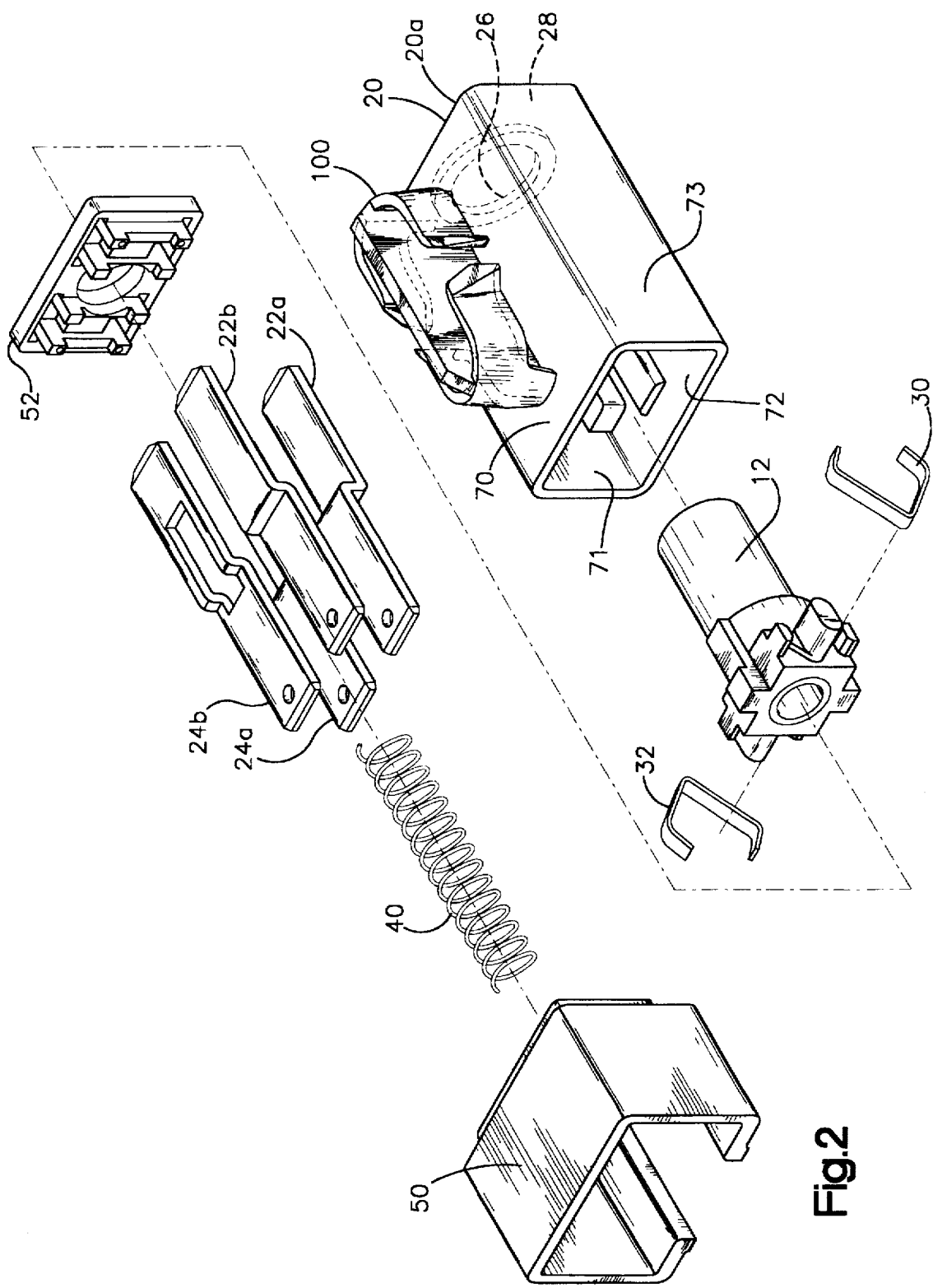
FIG. 2 is a perspective view of the FIG. 1 switch showing components that are mounted within a switch housing.

The drawings illustrate a switch 10 for opening and closing an electrical circuit (not shown) in response to movement of a switch actuator 12. FIG. 1 is a perspective view of a completed switch and FIG. 2 is a perspective view of the components of the switch before the switch is assembled. The switch 10 includes a switch housing 20 supporting two pairs of conductive switch terminals. A first pair of terminals 22a, 22b are a normally open set of terminals and a second pair of terminals 24a, 24b are a normally closed set of terminals. The switch actuator 12 extends through an opening 26 in an end wall 28 of the switch housing 20. The actuator is supported by four walls 70–73 of the switch housing 20 for movement along a generally linear travel path to control an actuation state of the switch 10 by selectively shorting together pairs of the conductive switch terminals 22a, 22b, 24a, 24b.

Inside the housing interior the actuator 12 supports two switch contacts 30, 32 that selectively bridge or short an associated set of terminals. As an example, the switch contact 30 bridges the terminals 22a, 22b when the actuator is pushed into the housing 20 and the contact 32 moves out of electrical engagement with the terminals 24a, 24b when the actuator 12 is pushed into the housing. A spring 40 is trapped between a switch contact cover 50 and a plate 52 that moves with the actuator 12 and biases the actuator 12 through the opening 26.

The switch housing 20 is molded from plastic and includes mounting structure 100 (FIGS. 3 and 4) having first and second retainer posts 110, 120 coupled to a wall 70 of the switch housing 20 at separate spaced locations 111, 121 along a longitudinal axis 112 of the switch housing 20. Flexible first leg pairs 130a, 140a and second leg pairs 130b, 140b extend laterally from each of the respective retainer posts 110, 120. In the preferred and illustrated embodiment, the legs 130a, 130b, 140a, 140b are generally curved to form two u-shaped members that bend outwardly to form prongs at ends 160 of the u-shaped member.

The legs 130a, 130b define bottom surfaces 132a, 132b and the legs 140a, 140b define bottom surfaces 142a, 142b. The bottom surfaces 132a, 132b of the legs 130a, 130b are spaced from a surface of the wall 70 of the switch housing 20 by a first separation gap G1. The bottom surfaces 142a, 142b of the legs 140a, 140b are spaced from the surface of the wall 70 by a second separation gap G2.

Figures 6, 7:
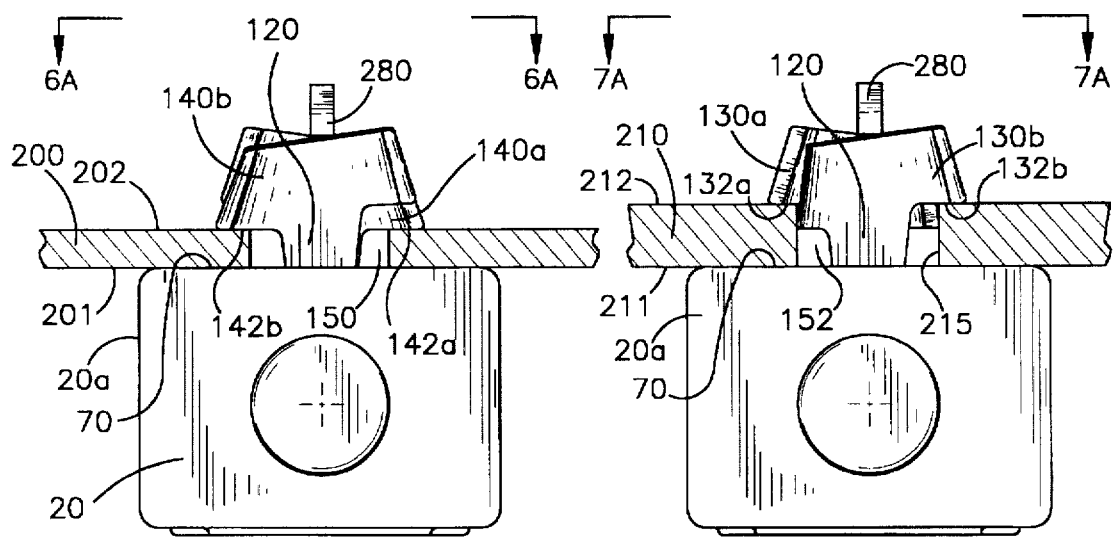
FIG. 6 is an end elevation view of the FIG. 1 switch as seen from the plane 6—6 in FIG. 4 installed in a mounting panel.
FIG. 7 is an end elevation view of a switch installed in a different thickness mounting panel as seen from the plane 7—7 in FIG. 4.

As seen in FIGS. 6 and 7, the housing structure 10 allows the switch housing 20 to be mounted into mounting panels 200, 210 having different thicknesses. The mounting panels 200, 210 have a bottom surfaces 201, 211 and substantially parallel top surfaces 202, 212 and a panel openings 150, 152.

FIG. 6 illustrates the switch housing 20 mounted in the panel 200. After the retainer posts 110, 120 are pushed into the panel opening 150 in the panel 200, the bottom surfaces 142a, 142b of the legs 140a, 140b engage the top surface 202 of the mounting panel 200. After installation, the surface of the wall 70 contacts the bottom surface 201 of the mounting panel 200.

FIG. 7 illustrates the switch housing 20 mounted in the panel 210. After the retainer posts 110, 120 are pushed into the opening 152 in the panel 210, the bottom surfaces 132a, 132b of the legs 130a, 130b engage the top surface 212 of the mounting panel 210. After installation, the surface of the wall 70 contacts the bottom surface 211 of the mounting panel 210.

Figure 3:
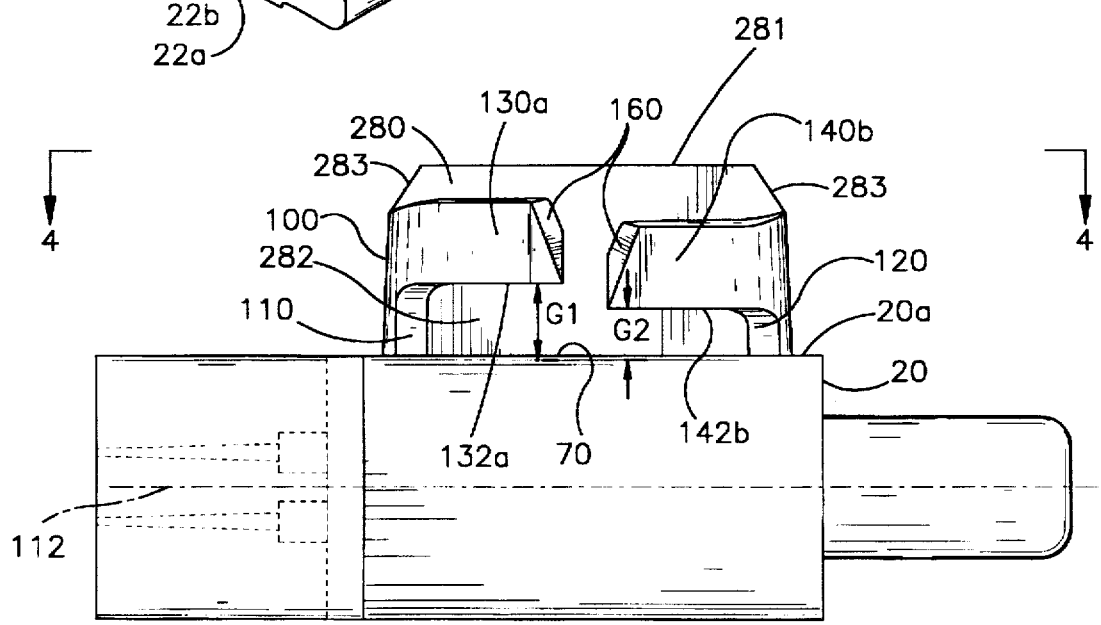
FIG. 3 is a side elevation view of the FIG. 1 switch.
Figures 6A, 7A:
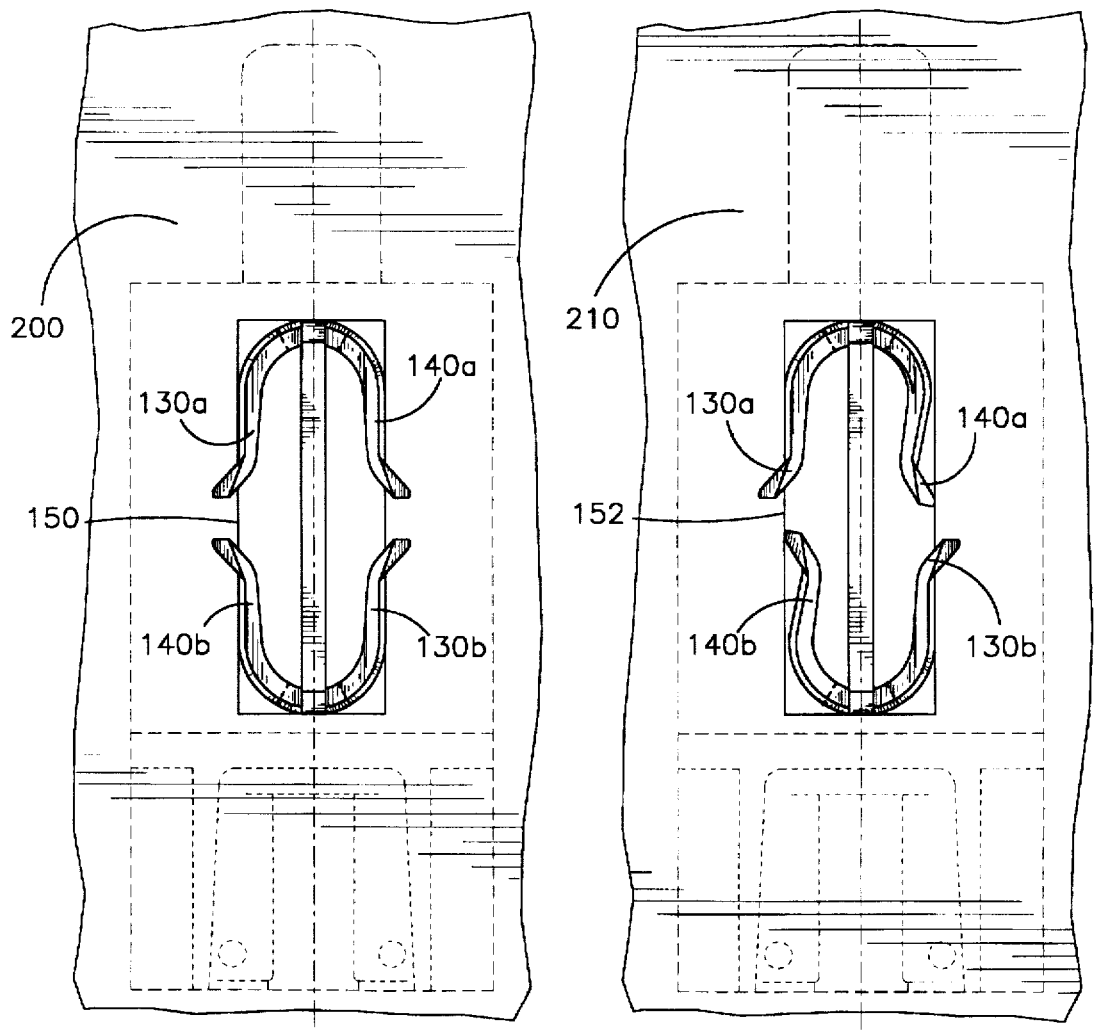
FIG. 6A is a plan view of the FIG. 1 switch installed in a different thickness mounting panel as seen from the plane 6A—6A in FIG. 6.
FIG. 7A is a plan view of the FIG. 1 switch installed in a mounting panel as seen from the plane 7A—7A in FIG. 7.

As shown in FIG. 3, the prong forming ends of the legs 130a, 130b, 140a, 140b have outer ramped or bevelled portions 160 which contact the panel (200 or 210) as the mounting structure 100 is pushed into the panel opening. This contact causes the legs 130a, 130b, 140a, 140b to flex away from their normal un-flexed position as the legs are pushed into the panel opening 150. In FIG. 6, the mounting panel 200 has a thickness slightly less than that of separation gap G2. In this arrangement, both sets of legs 130a, 130b and 140a, 140b return to their un-flexed configuration after installation (FIG. 6A). In FIG. 7, the mounting panel 210 has a thickness slightly less than that of separation gap G1 and greater than that of separation gap G2. In this arrangement, the legs 140a, 140b remain in a flexed orientation since they remain in contact with inner walls 215 of the panel opening 152 (FIG. 7A). The legs 130a, 130b return to their unflexed configuration with the surfaces 132a, 132b overlying the panel 210.

Figure 4:
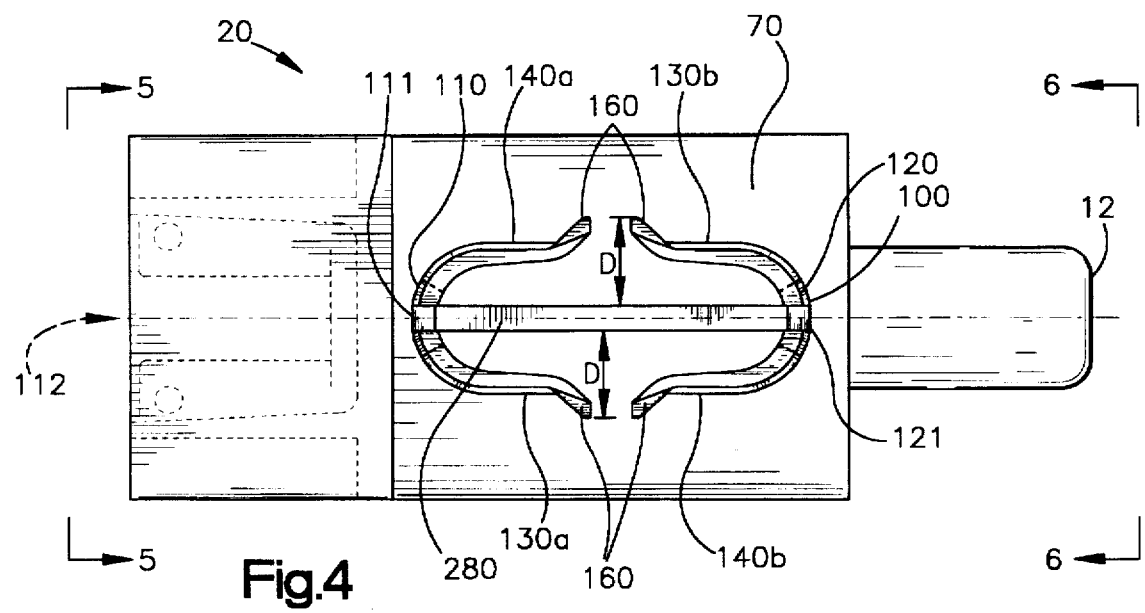
FIG. 4 is a plan view of the FIG. 1 switch as seen from the plane 4—4 in FIG. 3.

The two retainer posts 110, 120 are spaced apart by a distance slightly less than a length of the panel openings 150, 152 along the longitudinal axis 112. In the preferred embodiment, the retainer posts 110, 120 are bridged by a rib 280 along the longitudinal axis 112 that strengthens the structure 10 and facilitates mounting of the switch housing 20. The rib 280 extends generally normal to the housing surface 70 from which the two retainer posts 110, 120 extend. As shown in FIG. 4, the ends 160 of each of the four legs are laterally spaced a distance D from sides of the rib 280.

As shown in FIG. 3, the rib 280 includes an edge 281 spaced from and parallel to the housing surface 70. A preferred rib 280 has chamfered corners 283. The chamfered corners make the edge 281 shorter than the width of the panel openings 150, 152 and thus facilitates easy insertion into the panel opening 150. Chamfered corners 283 facilitate self-guided insertion of the switch 10 into the panel opening 150. Also, a base 282 of the rib 280 may be attached to the switch housing surface 70. In the preferred embodiment, the rib 280 is connected to the retainer posts 110, 120, the switch housing surface 70, and the base 282 to form a continuous integral structure.

One additional purpose of the rib 280 is to prevent flexure of the legs 130a, 130b, 140a, 140b beyond a position occupied by the rib 280 to prevent permanent deformation of the legs 130a, 130b, 140a, 140b. The rib 280 also inhibits bending of the retainer posts 110, 120 in the direction of the longitudinal axis 112. But for the presence of the rib 280, the posts 110, 120 might bend as the actuator 12 is depressed or by inadvertent bumping of the switch 10. Although this bending might not completely detach the switch 10, it could loosen the switch 10.

Figures 5, 5A:
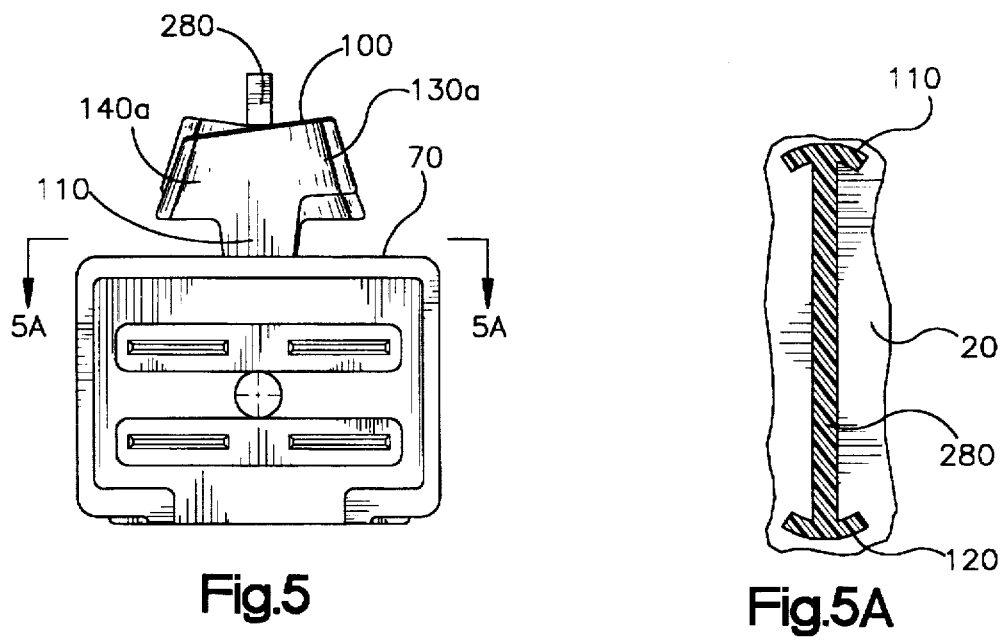
FIG. 5 is an end elevation view of the FIG. 1 switch as seen from the plane 5—5 in FIG. 4.
FIG. 5A is a section view of a structure for mounting the switch housing as seen from the plane 5A—5A in FIG. 5.

Referring to figure 5A, the retainer posts 110, 120 are arcuate and substantially conform to the u-shaped contour of the legs 130a, 130b, 140a, 140b. The purpose of the arcuate shape of the retainer posts 110, 120 is to prevent bending of the retainer posts 110, 120 and the rib 280 in the lateral direction perpendicular to the longitudinal axis 112 which may be caused by inadvertent bumping of the switch 10.

A preferred embodiment of the present invention has been described with a degree of particularity. It is the intent, however, that the invention include all modifications and alterations from the disclosed design falling within the spirit or scope of the appended claims.

What is claimed is:

1. A switch apparatus comprising:
   a) a switch housing supporting conductive switch terminals within a switch housing interior;
   b) a switch actuator supported by the switch housing for movement along a travel path to control an actuation state of said switch by selectively shorting the conductive switch terminals; and
   c) structure for mounting the switch housing into different thickness mounting panels, comprising:
      i) first and second retainer posts coupled to the switch housing at separate spaced locations along a longitudinal axis of the switch housing;
      ii) flexible first and second legs extending laterally from each said retainer post that can be flexed away from a first position and inserted into a panel opening in a mounting panel;
      iii) wherein each of said legs have bottom portions that contact a mounting panel surface wherein said bottom portion of the first leg is spaced from a wall of the switch housing by a first gap and said bottom portion of the second leg is spaced from the wall of the switch housing by a second gap; and
      iv) wherein said retainer posts are bridged by a rib portion that extends along said longitudinal axis and generally normal to a switch housing surface from which the two retainer posts extend.

2. The switch apparatus of claim 1 wherein said rib portion comprises a tapered end spaced from the housing surface to facilitate insertion of said rib and said retainer posts into the panel opening.

3. The switch apparatus of claim 1 wherein the two retainer posts are spaced by a distance slightly less than a length of the panel opening along said longitudinal axis.

4. The switch apparatus of claim 1 wherein a base of said rib portion is attached to the switch housing surface.

5. The switch apparatus of claim 1 wherein said rib prevents flexure of said legs beyond a position occupied by said rib to prevent permanent deformation of the legs.

6. The switch apparatus of claim 1 wherein said rib is connected to said retainer posts and said switch housing surface to form a continuous integral structure that prevents the retainer posts from bending in the direction of said longitudinal axis.

7. The switch apparatus of claim 1 wherein the first leg of the first retainer post is laterally spaced a distance from one side of the rib and the first leg of the second retainer post is laterally spaced approximately the same distance from an opposite side of the rib.

8. The switch apparatus of claim 1 wherein the second leg of the first retainer post is laterally spaced a distance from one side of the rib and the second leg of the second retainer post is laterally spaced approximately the same distance from an opposite side of the rib.

9. A switch apparatus for use in different thickness mounting panels, comprising:
 a) a switch housing supporting conductive switch terminals within a switch housing interior;
 b) a switch actuator supported by the switch housing for movement along a travel path to control an actuation state of said switch apparatus by selectively shorting the conductive switch terminals; and
 c) structure extending outwardly from a switch housing surface for mounting the switch housing into the different thickness mounting panels said structure comprising:
  i) first and second retainer posts coupled to the switch housing and extending outwardly from the switch housing surface at separate spaced locations along a longitudinal axis of the switch housing;
  ii) flexible first and second legs extending laterally from each said retainer post that can be flexed away from a first position and inserted into a panel opening in a mounting panel;
  iii) wherein each of said legs have bottom portions that contact a mounting panel surface wherein said bottom portion of the first leg is spaced from the switch housing surface by a first gap and said bottom portion of the second leg is spaced from the switch housing surface by a second gap having a gap width different from the first gap;
  iv) wherein said legs are generally curved.

10. The switch apparatus of claims 9 wherein either the bottom portion of said first legs or the bottom portion of said second legs are adapted to engage a surface of said mounting panel after said retainer posts are pushed into a panel opening in the mounting panel.

11. A switch apparatus comprising:
 a) a switch housing supporting conductive switch terminals within a switch housing interior;
 b) a switch actuator supported by the switch housing for movement alone a travel path to control an actuation state of said switch by selectively shorting the conductive switch terminals; and
 c) structure for mounting the switch housing to a generally planar panel having a panel opening comprising:
  i) two retainers coupled to the switch housing at spaced apart locations on the switch housing;
  ii) said retainers having first and second legs having panel contacting surfaces spaced from a wall surface of the switch housing by a separation cap at least as wide as a thickness of the panel;
  iii) said legs having ramped portions for causing the leas to flex as said retainers are pushed into the panel opening and that inhibit further relative movement between the switch housing and the panel after the leas snap back to a configuration overlying the panel;
  iv) said first and second legs are spaced different separation gaps from the wall surface of the switch housing to accommodate different thickness panels.

12. The switch apparatus of claim 11 wherein said retainers are bridged by a rib portion extending generally normal to a switch housing surface which supports the two retainers.

13. The switch apparatus of claim 11 wherein said legs are generally curved.

14. A switch apparatus comprising:
 a) a switch housing supporting conductive switch terminals within a switch housing interior;
 b) a switch actuator supported by the switch housing for movement along a travel path to control an actuation state of said switch by selectively shorting the conductive switch terminals; and
 c) structure for mounting the switch housing into a selected one of two mounting panels wherein each of the mounting panels has a different thickness, comprising:
  i) two retainers having a generally unshaped member and first and second flexible leg segments;
  ii) first and second retainer posts spaced along a longitudinal axis of the switch housing to which the two retainers are connected; and
  iii) said first leg segments forming a first separation gap from a wall of the switch housing and said second leg segments forming a second separation gap from the wall of the switch housing.

15. The switch apparatus of claim 14 wherein the leg segments have ramped portions for causing the leg segments to flex as the retainers are pushed into a panel opening for inhibiting further relative movement between the switch housing and the panel after the leg segments snap back to an unflexed configuration.

16. The switch apparatus of claim 14 wherein the two retainer posts are spaced by a distance slightly less than a length of a panel opening in the selected one of two mounting panels.

17. The switch apparatus of claim 14 wherein the first leg segment of the first retainer is laterally spaced a distance from the longitudinal axis and the first leg segment of the second retainer is laterally spaced approximately the same distance from the opposing side of the longitudinal axis.

18. The switch apparatus of claim 14 wherein the second leg segment of the first retainer is laterally spaced a distance from the longitudinal axis and the second leg segment of the second retainer is laterally spaced approximately the same distance from the opposing side of the longitudinal axis.

19. The switch apparatus of claim 14 wherein said retainer posts are arcuate and substantially conform to the curved dimension of said unshaped members.

20. The switch apparatus of claim 14 wherein either a bottom portion of said first leg segments or a bottom portion of said second leg segments are adapted to engage a bottom surface of said mounting panel after the retainers are pushed into a panel opening in the mounting panel.

21. The switch apparatus of claim 14 wherein the retainer posts are bridged by a rib portion that extends generally normal to a switch housing surface which supports the two retainer posts.

22. The switch apparatus of claim 21 wherein said rib portion comprises a tapered end spaced from the housing surface to facilitate insertion of said rib and said retainers into a panel opening.

23. The switch apparatus of claim 21 wherein a base of said rib portion is attached to the switch housing surface.

24. The switch apparatus of claim 21 wherein said rib prevents flexure of said leg segments beyond a position occupied by said nib to prevent permanent deformation of the leg segments.

25. A method of mounting a switch onto a selected one of two mounting panels wherein each of the mounting panels has a different thickness comprising the steps of:

a) forming a switch housing having separate retainer posts coupled to the switch housing at spaced locations along a longitudinal axis; said retainer posts each having first and second flexible leas extending laterally from said posts; and said legs having bottom portions;

b) mounting switch contacts within said housing;

c) providing a selected one of two mounting panels that include a mounting surface and a panel opening dimensioned to accommodate the switch housing;

d) pushing the switch housing into the panel opening of either one of said two panels until the bottom portion of said first legs or second legs engages the mounting surface of the selected mounting panel and secures said switch to the selected mounting panel;

e) providing ramped portions on said flexible legs for causing the flexible legs to flex as the retainer posts are pushed into the panel opening and to inhibit further relative movement between the switch housing and the panel after the flexible legs snap back to an unflexed configuration overlying the panel.

26. In the method of claim 25, providing a rib portion positioned coincident with the longitudinal axis and extending generally normal to a switch housing surface.

27. In the method of claim 26, providing a tapered end disposed on said rib portion to facilitate insertion of said rib portion and said retainer posts.

* * * * *